(12) United States Patent
Hanazawa (10) Patent No.: US 8,315,870 B2
(45) Date of Patent: Nov. 20, 2012

(54) RESCORING SPEECH RECOGNITION HYPOTHESIS USING PROSODIC LIKELIHOOD

(75) Inventor: Ken Hanazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 249 days.

(21) Appl. No.: 12/672,015

(22) PCT Filed: Aug. 22, 2008

(86) PCT No.: PCT/JP2008/065008
§ 371 (c)(1),
(2), (4) Date: Apr. 21, 2010

(87) PCT Pub. No.: WO2009/025356
PCT Pub. Date: Feb. 26, 2009

(65) Prior Publication Data
US 2011/0196678 A1 Aug. 11, 2011

(30) Foreign Application Priority Data
Aug. 22, 2007 (JP) ................................. 2007-215958

(51) Int. Cl.
*G10L 15/04* (2006.01)
(52) U.S. Cl. .......................... 704/254; 704/251; 704/240
(58) Field of Classification Search .................. 704/231, 704/236, 238, 240, 249, 251, 254, E15.02, 704/25, 49
See application file for complete search history.

(56) References Cited

U.S. PATENT DOCUMENTS

| | | | | |
|---|---|---|---|---|
| 5,806,031 A | * | 9/1998 | Fineberg | 704/254 |
| 5,806,033 A | * | 9/1998 | Lyberg | 704/255 |
| 5,907,826 A | * | 5/1999 | Takagi | 704/251 |
| 6,253,178 B1 | * | 6/2001 | Robillard et al. | 704/238 |
| 6,510,410 B1 | * | 1/2003 | Chen et al. | 704/251 |
| 6,829,578 B1 | * | 12/2004 | Huang et al. | 704/211 |
| 7,043,430 B1 | * | 5/2006 | Chung et al. | 704/251 |
| 7,181,391 B1 | * | 2/2007 | Jia et al. | 704/231 |

(Continued)

FOREIGN PATENT DOCUMENTS

JP 165900 A 7/1988

(Continued)

OTHER PUBLICATIONS

International Search Report for PCT/JP2008/065008, mailed Nov. 4, 2008.

(Continued)

*Primary Examiner* — Jesse Pullias (57) ABSTRACT

A distance calculation unit (16) obtains the acoustic distance between the feature amount of input speech and each phonetic model. A word search unit (17) performs a word search based on the acoustic distance and a language model including the phoneme and prosodic label of a word, and outputs a word hypothesis and a first score representing the likelihood of the word hypothesis. The word search unit (17) also outputs a vowel interval and its tone label in the input speech, when assuming that the recognition result of the input speech is the word hypothesis. A tone recognition unit (21) outputs a second score representing the likelihood of the tone label output from the word search unit (17) based on a feature amount corresponding to the vowel interval output from the word search unit (17). A rescore unit (22) corrects the first score of the word hypothesis output from the word search unit (17) using the second score output from the tone recognition unit (21). This allows to raise the speech recognition accuracy for tone speech.

20 Claims, 9 Drawing Sheets

U.S. PATENT DOCUMENTS

2005/0055207 A1* 3/2005 Fukada .................... 704/254
2007/0276659 A1* 11/2007 Yamada .................... 704/217

FOREIGN PATENT DOCUMENTS

| | | |
|---|---|---|
| JP | 04-128899 A | 4/1992 |
| JP | 07-261778 A | 10/1995 |
| JP | 3162994 A | 2/2001 |
| JP | 2001-282282 A | 10/2001 |

OTHER PUBLICATIONS

S. Onodera et al., "Multipath Based Word Recognition under Noisy Environments—Use of Accent Information", The Acoustical Society of Japan, 2004 Spring Meeting of the Acoustical Society of Japan, Mar. 17, 2004, pp. 161-162.

* cited by examiner

「您好」 (WORD A)

FIG. 4B

「你好」 (WORD B)

RESCORING SPEECH RECOGNITION HYPOTHESIS USING PROSODIC LIKELIHOOD

This application is the National Phase of PCT/JP2008/065008, filed on Aug. 22, 2008 which is based upon and claims the benefit of priority from Japanese patent application No. 2007-215958, filed on Aug. 22, 2007, the disclosure of which is incorporated herein in its entirety by reference.

TECHNICAL FIELD

The present invention relates to a speech recognition technique and, more particularly, to a speech recognition technique for a language using prosody such as tones (voice tones).

BACKGROUND ART

There are various languages using prosody. For example, Chinese uses prosody called tones. Tones are sound pitch patterns used to distinguish between meanings, and mainly, vowels have unique tones such as rising and falling tones. It is therefore important to recognize the tones for recognition of Chinese speech.

A technique disclosed in Japanese Patent No. 3162994 (reference 1) is known as a speech recognition technique using tones. The Chinese speech recognition technique described in reference 1 divides a syllable into a first half portion and a second half portion, associates only the second half portion of the syllable with a tone, and recognizes speech using the associated tone. Since speech recognition is executed using tones, this technique can make the voice tone speech recognition accuracy higher than in a technique without using tones.

DISCLOSURE OF INVENTION

Problem to be Solved by the Invention

However, the technique of reference 1 simply divides a syllable into a first half portion and a second half portion, and the second half portion can include a consonant. Hence, tone recognition may be done even for a consonant having no voice tone. In this case, the tone recognition result may be inaccurate, and the speech recognition accuracy may lower.

An exemplary object of the invention is to improve the speech recognition accuracy for a language having prosody such as tones.

Means of Solution to the Problem

A speech recognition apparatus according to an exemplary aspect of the invention includes word search means for performing a word search based on an acoustic distance between a phonetic model and a feature amount of input speech and a phoneme of a word in a language model including the phoneme and a prosodic label of the word, outputting a word hypothesis and a first score representing likelihood of the word hypothesis as a word search result, and when assuming that a recognition result of the input speech is the word hypothesis, outputting a prosodic interval and a prosodic label of the prosodic interval in the input speech, prosodic recognition means for outputting a second score representing likelihood of the prosodic label output from the word search means, based on one of feature amounts of the input speech corresponding to the prosodic interval output from the word search means, and rescore means for correcting the first score of the word hypothesis output from the word search means using the second score output from the prosodic recognition means.

A speech recognition method according to another exemplary aspect of the invention includes the steps of performing a word search based on an acoustic distance between a phonetic model and a feature amount of input speech and a phoneme of a word in a language model including the phoneme and a prosodic label of the word, outputting a word hypothesis and a first score representing likelihood of the word hypothesis as a word search result, and when assuming that a recognition result of the input speech is the word hypothesis, outputting a prosodic interval and a prosodic label of the prosodic interval in the input speech, outputting a second score representing likelihood of the output prosodic label based on one of feature amounts of the input speech corresponding to the output prosodic interval, and correcting the output first score of the word hypothesis using the output second score.

Effect of the Invention

According to the present invention, it is possible to raise the speech recognition accuracy for a language having prosody such as tones.

BEST MODE FOR CARRYING OUT THE INVENTION

The exemplary embodiments of the present invention will now be described in detail with reference to the accompanying drawings.

First Exemplary Embodiment of Present Invention

A speech recognition apparatus according to the first exemplary embodiment of the present invention will be described.

Figure 1:
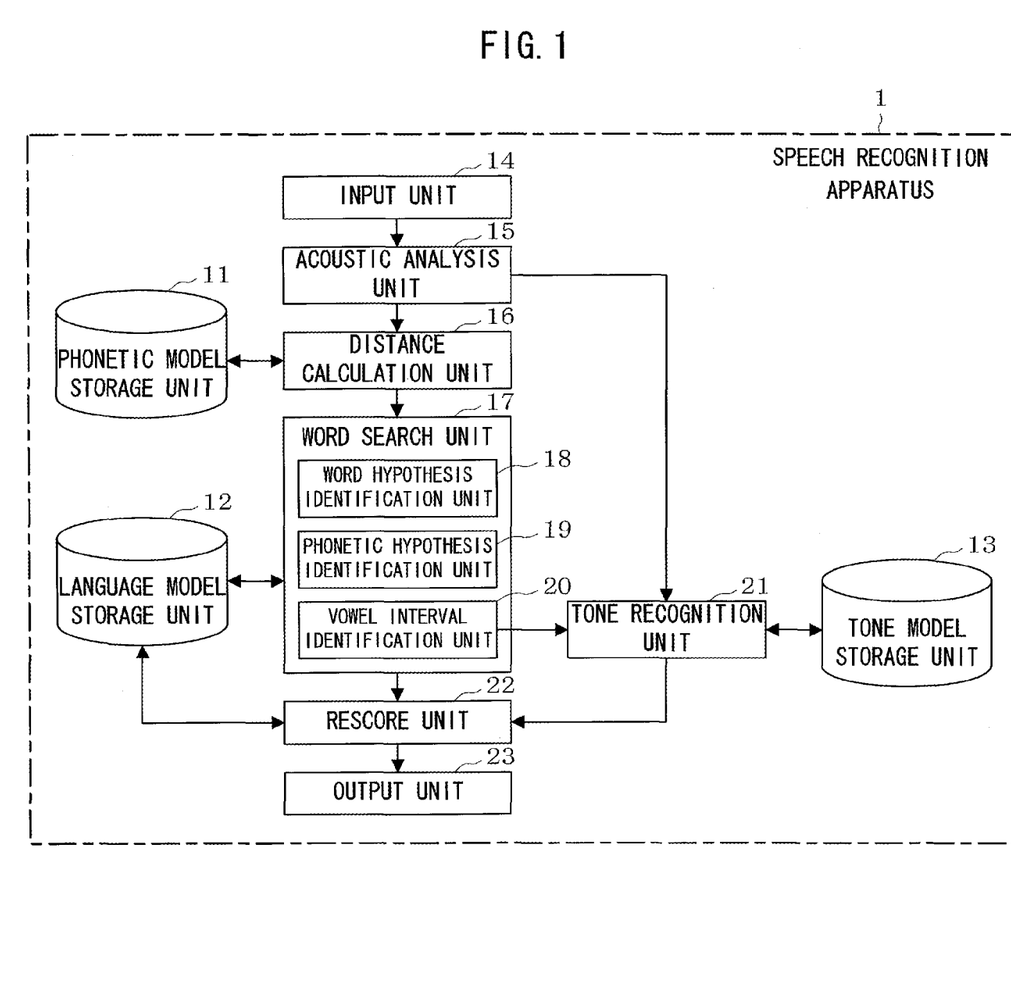
FIG. 1 is a block diagram showing an example of the overall arrangement of a speech recognition apparatus according to the first exemplary embodiment of the present invention.

Explanation of Arrangement of First Exemplary Embodiment of Present Invention FIG. 1 is a block diagram showing an example of the overall arrangement of the speech recognition apparatus according to the first exemplary embodiment of the present invention.

Referring to FIG. 1, a speech recognition apparatus 1 includes three kinds of model storage units, i.e., a phonetic model storage unit 11 which registers phonetic models formed by modeling phonemes, a language model storage unit 12 which registers language models including the phonemes and tone labels of words, and a tone model storage unit 13 which registers tone models formed by modeling the acoustic features of tones.

The speech recognition apparatus 1 also includes an input unit 14, acoustic analysis unit 15, distance calculation unit 16, word search unit 17, tone recognition unit 21 serving as a prosodic recognition means, rescore unit 22, and output unit 23.

The input unit 14 has a function of inputting speech. The acoustic analysis unit 15 has a function of acoustically analyzing the speech input from the input unit 14 and outputting the feature amount of the input speech. The distance calculation unit 16 has a function of calculating the acoustic distance between the feature amount that is the acoustic analysis result and each phonetic model registered in the phonetic model storage unit 11.

The word search unit 17 has a function of executing a word search based on the acoustic distances obtained by the distance calculation unit 16 and the language models registered in the language model storage unit 12, and outputting, to the rescore unit 22, a word search result including a plurality of word hypotheses (recognition result candidates) and first scores representing the likelihoods of the word hypotheses. The word search unit 17 of this exemplary embodiment also has a function of, when assuming that each of the plurality of word hypotheses be the recognition result of the input speech, outputting vowel intervals and their tone labels in the input speech.

To implement this function, the word search unit 17 includes a word hypothesis identification unit 18, phonetic hypothesis identification unit 19, and vowel interval identification unit 20. The word hypothesis identification unit 18 identifies each word hypothesis obtained by the word search. The phonetic hypothesis identification unit 19 identifies phonemes in each word hypothesis. The vowel interval identification unit 20 identifies, for each word hypothesis, vowel intervals in the input speech based on the identified phonemes and the correspondence relation between the input speech and the phonemes used for the word search, and outputs pairs of identified vowel intervals and their tone labels to the tone recognition unit 21.

The tone recognition unit 21 has a function of obtaining, for each word hypothesis, second scores each representing the likelihood of a tone label for the word hypothesis based on the feature amount corresponding to a vowel interval output from the word search unit 17 and the tone models registered in the tone model storage unit 13, and outputting the second scores to the rescore unit 22.

The rescore unit 22 has a function of correcting the first score of each word hypothesis output from the word search unit 17 using the corresponding second scores of the word hypothesis output from the tone recognition unit 21. The output unit 23 has a function of selectively outputting, based on the corrected first scores, a recognition result from the plurality of word hypotheses obtained by the word search.

Note that the speech recognition apparatus 1 can be implemented by a computer in, e.g., the following way. A disk, semiconductor memory, or any other recording medium recording a program that causes a computer to function as the speech recognition apparatus 1 is prepared, and the computer reads out the program. The computer controls its operation based on the readout program, thereby implementing the acoustic analysis unit 15, distance calculation unit 16, word search unit 17, tone recognition unit 21, rescore unit 22, and output unit 23 on the computer.

Figure 2:
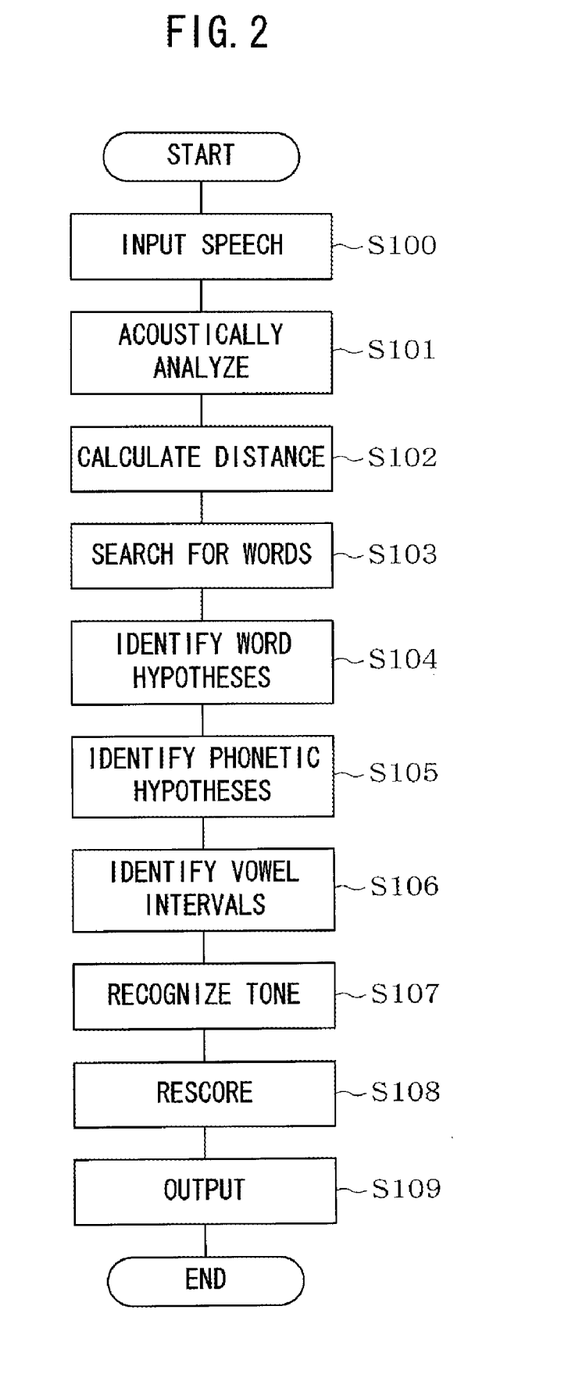
FIG. 2 is a flowchart illustrating an example of an operation according to the first exemplary embodiment.

Explanation of Operation of First Exemplary Embodiment of Present Invention The operation of this exemplary embodiment will be described next in detail with reference to FIGS. 1 and 2.

Upon receiving speech uttered by the user from the input unit 14 (step S100 in FIG. 2), the acoustic analysis unit 15 acoustically analyzes the input speech to obtain the feature amount of the speech (step S101). After that, the distance calculation unit 16 calculates the acoustic distance between the feature amount obtained in step S101 and each phonetic model registered in the phonetic model storage unit 11 (the acoustic distance represents the acoustic likelihood of each phoneme) (step S102).

After the distance calculation unit 16 has calculated the acoustic distance between the feature amount and each phonetic model, the word search unit 17 executes a word search based on the acoustic distances and the language models registered in the language model storage unit 12, and outputs, to the rescore unit 22, a word search result including a plurality of word hypotheses and first scores representing the likelihoods of the word hypotheses (step S103).

Next, the word hypothesis identification unit 18 in the word search unit 17 identifies the word hypotheses obtained by the search in step S103 (step S104). The phonetic hypothesis identification unit 19 then identifies, based on the language models, phonemes in each word hypothesis identified in step S104 (step S105). Then, the vowel interval identification unit 20 identifies, for each word hypothesis identified in step S104, vowel intervals in the input speech based on the phonemes identified in step S105 and the correspondence relation between the input speech and the phonemes used for the word search in step S103, and outputs pairs of identified vowel intervals and their tone labels to the tone recognition unit 21 (step S106).

For each pair of a vowel interval and its tone label output from the word search unit 17, the tone recognition unit 21 performs tone recognition based on the feature amount corresponding to the vowel interval and the tone models registered in the tone model storage unit 13, and outputs a second score representing the likelihood of the tone label to the rescore unit 22 (step S107).

The rescore unit 22 corrects the first score of each word hypothesis using the corresponding second scores of the word hypothesis output from the tone recognition unit 21 (step S108). The output unit 23 decides a recognition result from the plurality of word hypotheses based on the corrected first scores and outputs the recognition result (step S109).

Effect of First Exemplary Embodiment of Present Invention

According to this exemplary embodiment, it is possible to accurately recognize voice tone speech. This is because the tone recognition target interval is limited to a vowel interval obtained based on word search information that can optimally combine acoustic information (feature amount) and language information. That is, as compared to a technique of simply obtaining a tone recognition target interval (vowel interval) based on acoustic information, the risk of erroneously defining an interval other than a vowel interval as a tone recognition interval lessens. Since it is possible to suppress tone recognition errors, the recognition accuracy can be made higher.

Example of First Exemplary Embodiment

An example of the first exemplary embodiment will be described next.

Explanation of Arrangement of Example of First Exemplary Embodiment

Figure 3:
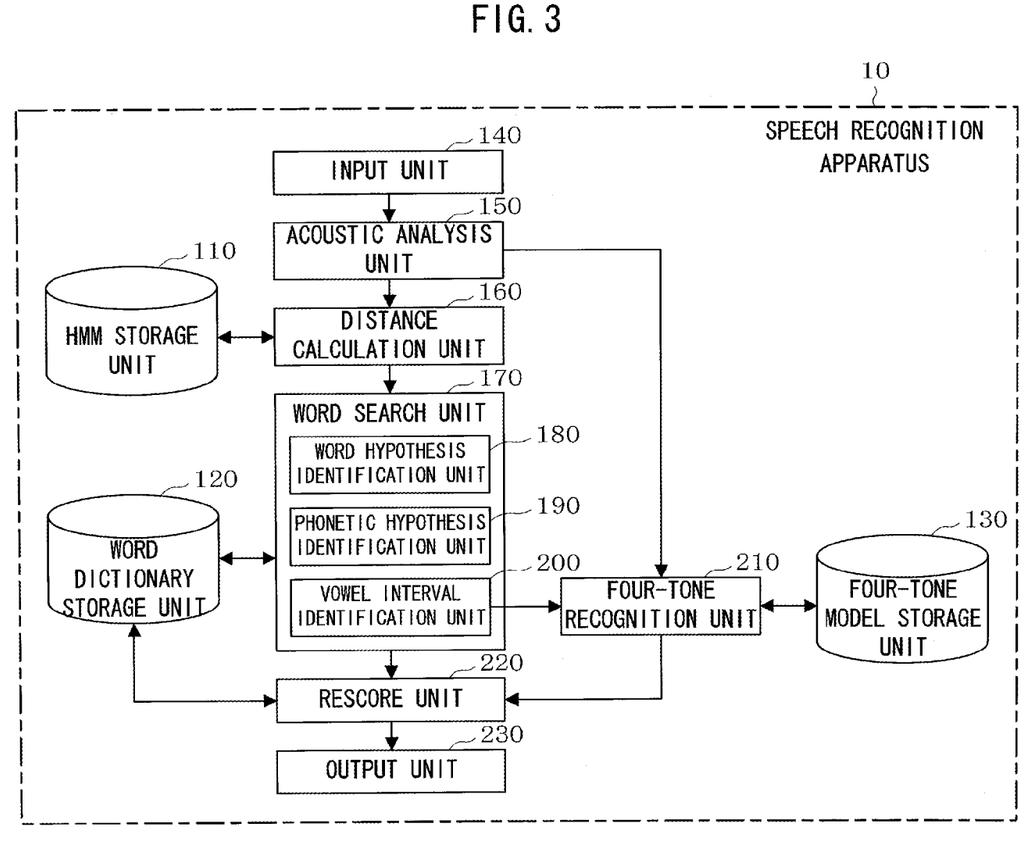
FIG. 3 is a block diagram showing an example of the first exemplary embodiment.

FIG. 3 is a block diagram showing an example of the overall arrangement of a speech recognition apparatus 10 according to this example.

The speech recognition apparatus 10 of this example includes three storage units, i.e., an HMM (Hidden Markov Model) storage unit 110 which registers HMMs serving as phonetic models, a word dictionary storage unit 120 which registers a word dictionary having the phonemes and tone labels of words to be recognized, and a four-tone model storage unit 130 which registers, as tone models, four-tone models formed by modeling the acoustic features of four tones by, e.g., GMMs (Gaussian Mixture Models). The storage units 110, 120, and 130 correspond to the phonetic model storage unit 11, language model storage unit 12, and tone model storage unit 13 shown in FIG. 1, respectively.

The speech recognition apparatus 10 also includes an input unit 140, acoustic analysis unit 150, distance calculation unit 160, word search unit 170 having a word hypothesis identification unit 180, phonetic hypothesis identification unit 190, and vowel interval identification unit 200, four-tone recognition unit 210, rescore unit 220, and output unit 230. The functional units 140, 150, 160, 170, 210, 220, and 230 correspond to the input unit 14, acoustic analysis unit 15, distance calculation unit 16, word search unit 17, tone recognition unit 21, rescore unit 22, and output unit 23 shown in FIG. 1, respectively, and have the same functions.

Note that the speech recognition apparatus 10 of this example can also be implemented by a computer, like the speech recognition apparatus 1 of the first exemplary embodiment.

Explanation of Operation of Example of First Exemplary Embodiment

The operation of this example will be described next in detail.

Figure 4A:
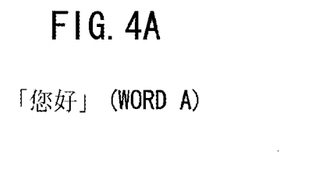
FIGS. 4A and 4B are views showing examples of words.
Figure 4B:
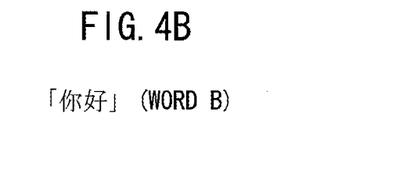
Figure 5:
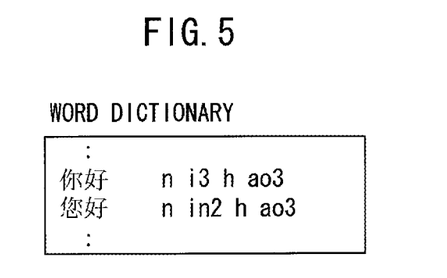
FIG. 5 is a view showing an example of the contents of a word dictionary.

Assume that, for example, the user utters a word shown in FIG. 4A. Note that the word shown in FIG. 4A will be referred to as a word A, and the word shown in FIG. 4B will be referred to as a word B in the following description. The word dictionary registered in the word dictionary storage unit 120 registers words such as the words A and B at a phonetic level together with tone labels such as "3 (third tone)" of "i3" and "2 (second tone)" of "in2", as shown in FIG. 5.

The acoustic analysis unit 150 acoustically analyzes the speech input from the input unit 140, and obtains, for example, the cepstrum and pitch per unit time (frame) as the feature amount.

The distance calculation unit 160 calculates, for each frame, the distance between the cepstrum obtained by the acoustic analysis unit 150 and each HMM registered in the HMM storage unit 110, and outputs the acoustic distance (a score representing likelihood) between each phoneme and the cepstrum in each frame as a distance calculation result.

When the distance calculation unit 160 has output the distance calculation result, the word search unit 170 executes the following processing sequentially for the words in the word dictionary. Based on the phonemes included in the process target word and the distance calculation result received from the distance calculation unit 160, the word search unit 170 obtains, for each phoneme, a frame corresponding to the phoneme and an acoustic distance (score) representing acoustic likelihood. For example, when the process target is the word A shown in FIG. 4A, phonemes "n i3 h ao3" are included in the word A, as shown in FIG. 5. Hence, the scores of phonetic models "n", "i", "h", and "ao" chained from the top of the distance calculation result are calculated in the order of frames, thereby obtaining information such as {the phonetic model "n" has a score "0.7" in frames "5 to 11", the phonetic model "i" has a score "0.8" in frames "12 to 19", . . . } or {the phonetic model "n" has a score "0.5" in frames "4 to 9", the phonetic model "i" has a score "0.6" in frames "10 to 17", . . . }. After that, the score of the information (for example, the sum of the scores of the phonetic models) is obtained. The highest score is determined as the score of the process target word, and the information having the highest score is stored in a frame information storage unit (not shown) as the information used to execute the word search.

The word search unit 170 performs the above-described processing for all words registered in the word dictionary, and decides words serving as word hypotheses (recognition result candidates) based on the scores of the words. For example, a predetermined number of words are selected in descending order of scores, and the selected words are defined as word hypotheses.

Figure 6:
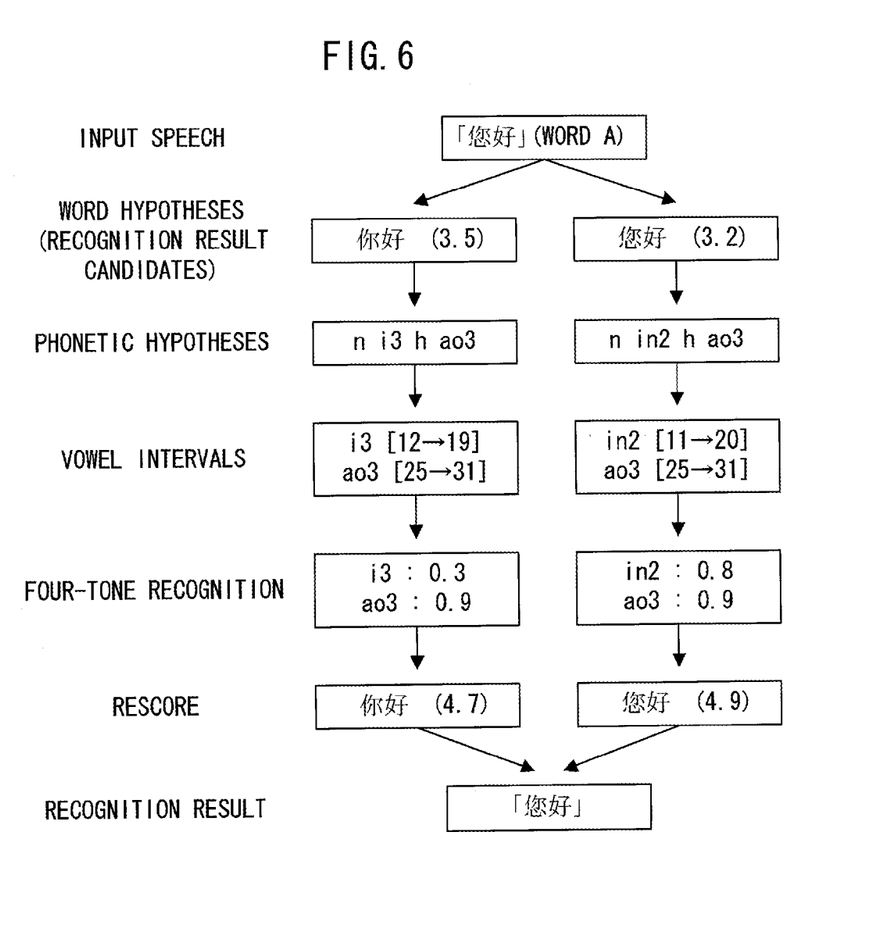
FIG. 6 is a view for explaining the operation of the example of the first exemplary embodiment.

Assume that with the above-described word search processing, the word A having a score "3.2" and the word B having a score "3.5" are obtained as recognition result candidates, as shown in FIG. 6.

When the word search processing has ended, the word hypothesis identification unit 180 in the word search unit 170 first identifies words to obtain the words A and B. Next, the phonetic hypothesis identification unit 190 identifies phonemes using the word dictionary so as to obtain "n in2 h ao3" from the word A and "n i3 h ao3" from the word B together with tone labels. After that, the vowel interval identification unit 200 identifies the vowel intervals of the words A and B based on the phonetic identification result and the information registered in the frame information storage unit.

As a consequence, vowel intervals corresponding to the vowel portions "in2" and "ao3" of the word A and those corresponding to the vowel portions "i3" and "ao3" of the word B are obtained as time (frame) information, as shown in FIG. 6.

The vowel interval identification unit 200 then transfers the vowel intervals of the words A and B and their tone labels to the four-tone recognition unit 210. The four-tone recognition unit 210 executes the following processing sequentially for the vowel intervals of the words. For one of the pitches as the analysis result of the acoustic analysis unit 150, which corresponds to a process target vowel interval, the four-tone recognition unit 210 executes four-tone recognition using four-tone models registered in the four-tone model storage unit 130, thereby calculating a score St representing the likelihood of the tone label of the vowel interval. For example, when the process target is the vowel interval "frames 12 to 19" of the vowel "i3" of the word B, a pitch corresponding to "frames 12 to 19" undergoes four-tone recognition using the four-tone models so as to calculate a score representing the likelihood of the vowel "i3". In the example of FIG. 6, the score representing the likelihood, as the third tone, of the vowel interval corresponding to the vowel "i3" of the word B is "0.3".

When a GMM is used as a model, as in this example, the score St of the four-tone recognition result can be calculated, using an N-dimensional feature vector x=(x1, x2, ..., xN) as the input and M as the number of mixed GMMs, by $$St = \sum_i^M w_i P_i(x) \quad \text{[Mathematical 1]}$$

$$\left( \sum_i^M w_i = 1 \right)$$

$$P_i(x) = \frac{1}{(2\pi)^{N/2}|\Sigma_i|^{1/2}} \exp\left\{ -\frac{1}{2}(x-\mu)\sum_i^{-1}(x-\mu) \right\}$$

where $\mu$ is the average vector of the four-tone models, $\Sigma i$ is the covariance matrix, and w is the weight. As the GMMs, four models representing the first to fourth tones are prepared here. For example, if the tone label of the recognition target indicates the third tone, a score is calculated using the GMM representing the third tone. Similarly, assume that a score "0.8" is obtained for the vowel "in2", and a score "0.9" is obtained for the vowel "ao3" in both word hypotheses. Using the four-tone recognition result, the rescore unit 220 rescores the word hypotheses as the word search result. Letting Sw be the score of an original word hypothesis, and St1, St2, ... be the scores of the four-tone recognition results of vowels that exist in a word. A score S after all word hypotheses have been rescored is given by $$S = Sw + \sum_n Stn \quad \text{[Mathematical 2]}$$

At this time, the score St of the four-tone recognition result may be normalized by the number of vowels or the number of frames. As the result of rescore, the score of the word A is "4.9", and the score of the word B is "4.7". That is, the ranks are reversed. The output unit 230 outputs the word A as the most likely recognition result.

To implement rescore, a method of performing the word search while correcting the score of a word hypothesis under processing or a method of correcting the score of each word hypothesis included in N-best candidates or word graphs corresponding to an intermediate result after the end of word search processing for one utterance is available. In the former method, since all word hypotheses are processed, the processing amount increases, but the accuracy can be expected to be higher. In the latter method, since the intermediate result generally includes only generated word hypotheses having high scores, the processing amount can be small, but the accuracy cannot improve sufficiently.

Figure 7:
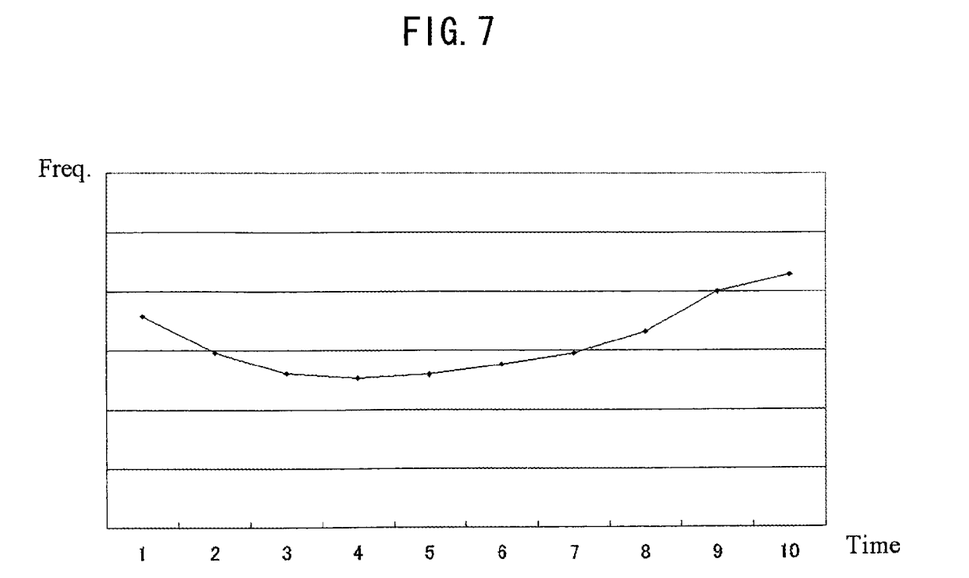
FIG. 7 is a graph for explaining a tone modeling method.

As the tone modeling method using GMMs, for example, as shown in FIG. 7, the pitch information of a target vowel interval is normalized in the time direction and frequency direction and N point of the contour are sampled to form an N-dimensional feature vector, and learning is performed, thereby modeling tones. At this time, Ft obtained by normalizing a frequency Ft at a time t is given by, e.g., $$\tilde{F}_t = \frac{Ft - F\min}{F\max - F\min} \quad \text{[Mathematical 3]}$$

where Fmax and Fmin are the maximum and minimum values of the frequency in the target interval.

Ft is further normalized at N points in the time direction.

This arrangement enables to independently learn the HMMs to be registered in the HMM storage unit 110 and the four-tone models to be registered in the four-tone model storage unit 130. For example, an HMM representing "i" can be learned as one model "i" independently of its four tones such as "i2" or "i3". Conversely, a four-tone model representing the third tone can be learned as one model "third tone" independently of its phoneme such as "i3" or "ao3". This is because the contour of each tone exhibits almost the same shape independently of the type of the phoneme. That is, according to this example, it is possible to obtain HMMs and four-tone models which enable accurate speech recognition with a little learning amount.

In this example, an example of recognition of one word has been described. However, it is also possible to recognize, by the same method, continuous speech that contains a plurality of words in one utterance. Even in this case, rescore is performed for each word hypothesis, and the sum of all scores is calculated.

In this example, four tones are modeled by GMMs. Instead, for example, an SVM may be used. In this case, since the SVM is a binary discriminator, discrimination is performed by preparing discrimination models for all combinations such as the discrimination model of the first and second tones and the discrimination model of the first and third tones. As a result, whether the most likely one of the four tones, i.e., a tone corresponding to the largest sum of discrimination results is the same as the tone label corresponding to an identified phoneme is output as a score and rescored. For example, when the tone label indicates the second tone, and one of the four tones corresponding to the largest sum of discrimination results is the second tone, a score "1.0" is output. Instead, if the tone is the first tone, a score "0" is output.

Second Exemplary Embodiment of Present Invention

A speech recognition apparatus according to the second exemplary embodiment of the present invention will be described next. This exemplary embodiment is characterized by performing tone recognition using not only tone models but also context models created by modeling context information serving as tone history information.

Explanation of Arrangement of Second Exemplary Embodiment of Present Invention

Figure 8:
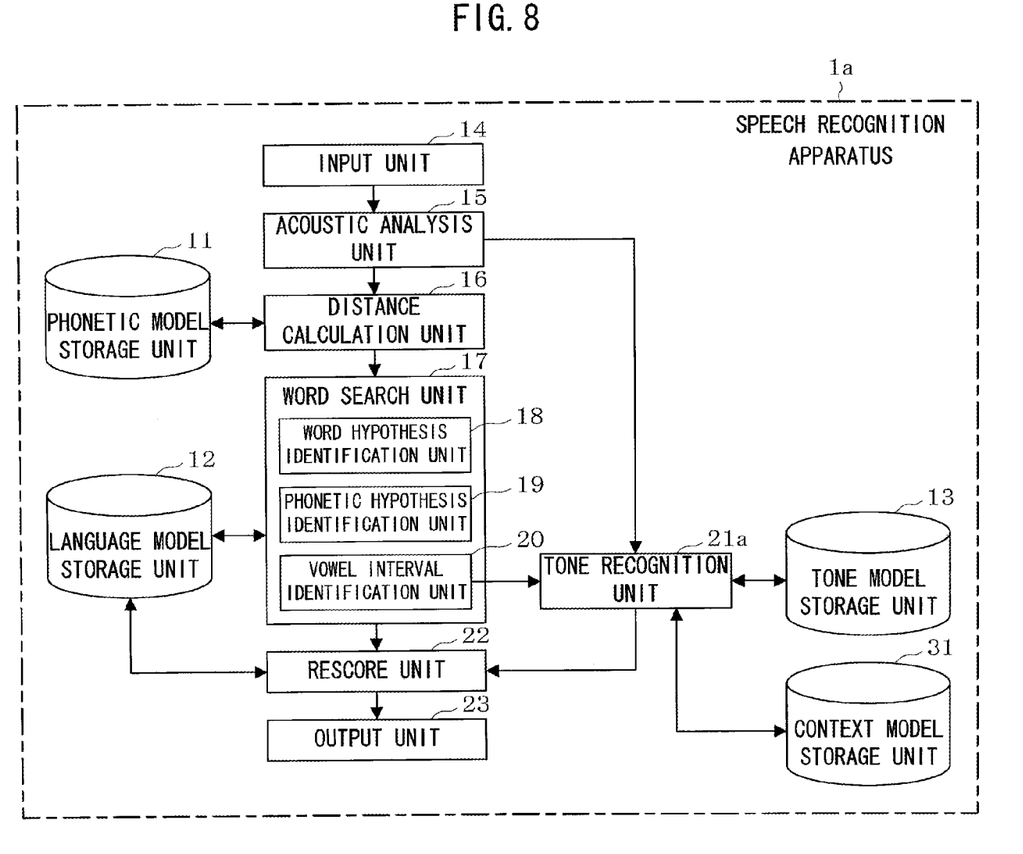
FIG. 8 is a block diagram of a speech recognition apparatus according to the second exemplary embodiment of the present invention.

FIG. 8 is a block diagram showing an example of the overall arrangement of the speech recognition apparatus according to this exemplary embodiment. Unlike the speech recognition apparatus 1 shown in FIG. 1, a speech recognition apparatus 1a shown in FIG. 8 additionally includes a context model storage unit 31, and also includes a tone recognition unit 21a in place of the tone recognition unit 21.

The context model storage unit 31 registers context models formed by modeling context information serving as tone history information.

The tone recognition unit 21a has a function of obtaining, for each word hypothesis, second scores each representing the likelihood of a tone label for the word hypothesis based on a feature amount corresponding to a vowel interval output from a vowel interval identification unit 20 in a word search unit 17, tone models registered in a tone model storage unit 13, and the context models registered in the context model storage unit 31, and outputting the second scores to a rescore unit 22.

Note that the speech recognition apparatus 1a of this exemplary embodiment can also be implemented by a computer, like the speech recognition apparatus 1.

Explanation of Operation of Second Exemplary Embodiment of Present Invention

The operation of this exemplary embodiment will be described next. Note that the operational difference from the above-described first exemplary embodiment is only the operation of the tone recognition unit 21a, and only the operation of the tone recognition unit 21a will be explained here.

The tone recognition unit 21a performs the following processing for each pair of a vowel interval and its tone label output from the word search unit 17. The tone recognition unit 21a executes tone recognition based on a feature amount corresponding to the vowel interval, the tone models registered in the tone model storage unit 13, and the context models registered in the context model storage unit 31, and outputs, to the rescore unit 22, second scores each representing the likelihood of a tone label.

Effect of Second Exemplary Embodiment

In this exemplary embodiment, tone recognition is performed using not only the tone models but also the context models. This allows to raise the tone recognition accuracy.

Example of Second Exemplary Embodiment

An example of the second exemplary embodiment will be described next.

Explanation of Arrangement of Example of Second Exemplary Embodiment

Figure 9:
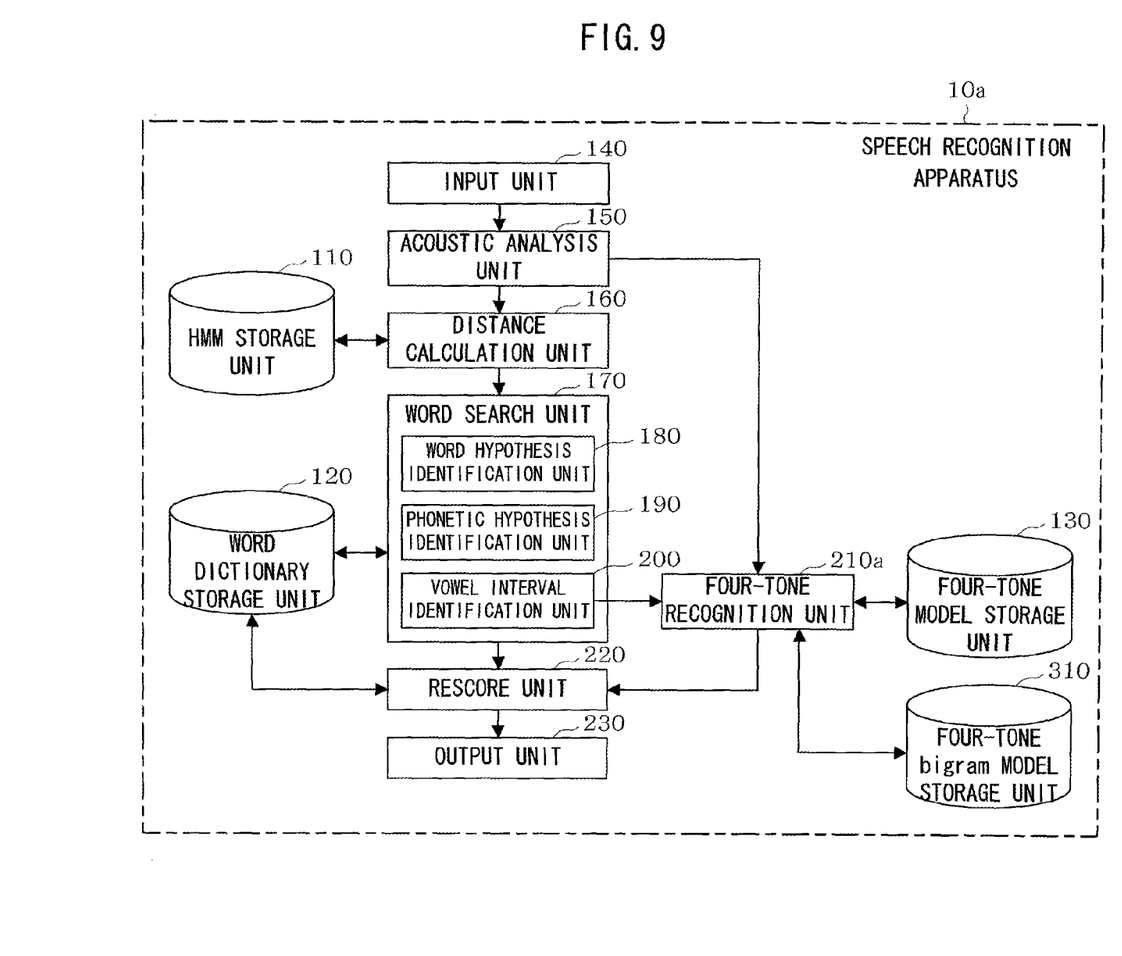
FIG. 9 is a block diagram showing an example of the overall arrangement of an example of the second exemplary embodiment.

FIG. 9 is a block diagram showing an example of the overall arrangement of a speech recognition apparatus 10a according to this example. Unlike the example of the first exemplary embodiment shown in FIG. 3, the speech recognition apparatus 10a additionally includes a four-tone bigram model storage unit 310 which registers four-tone bigram models, and also includes a four-tone recognition unit 210a in place of the four-tone recognition unit 210. Note that the four-tone bigram model storage unit 310 and the four-tone recognition unit 210a correspond to the context model storage unit 31 and the tone recognition unit 21a shown in FIG. 8, respectively.

The four-tone bigram model storage unit 310 registers, as context models, four-tone bigram models created by modeling the chain probabilities of the four tones.

The four-tone recognition unit 210a has a function of obtaining, for each word hypothesis, second scores each representing the likelihood of a tone label for the word hypothesis based on a feature amount corresponding to a vowel interval output from a vowel interval identification unit 200 in a word search unit 170, four-tone models registered in a four-tone model storage unit 130, and the four-tone bigram models registered in the four-tone bigram model storage unit 310, and outputting the second scores to a rescore unit 220.

Note that the speech recognition apparatus 10a of this example can also be implemented by a computer, like the speech recognition apparatus 1a.

Explanation of Operation of Example of Second Exemplary Embodiment

Figure 10A:
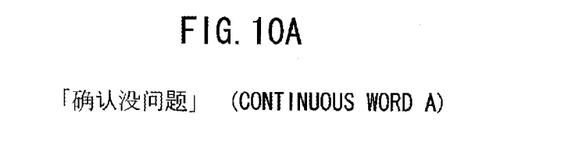
FIGS. 10A and 10B are views showing examples of continuous words.
Figure 10B:
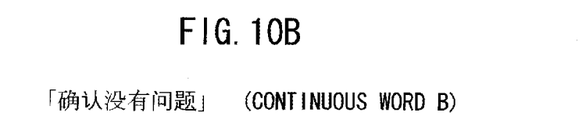

The operation of this example will be described next. Assume that, for example, the user utters a continuous word shown in FIG. 10A for an input unit 140. Note that the continuous word shown in FIG. 10A will be referred to as a continuous word A, and the continuous word shown in FIG. 10B will be referred to as a continuous word B in the following description.

Figure 11:
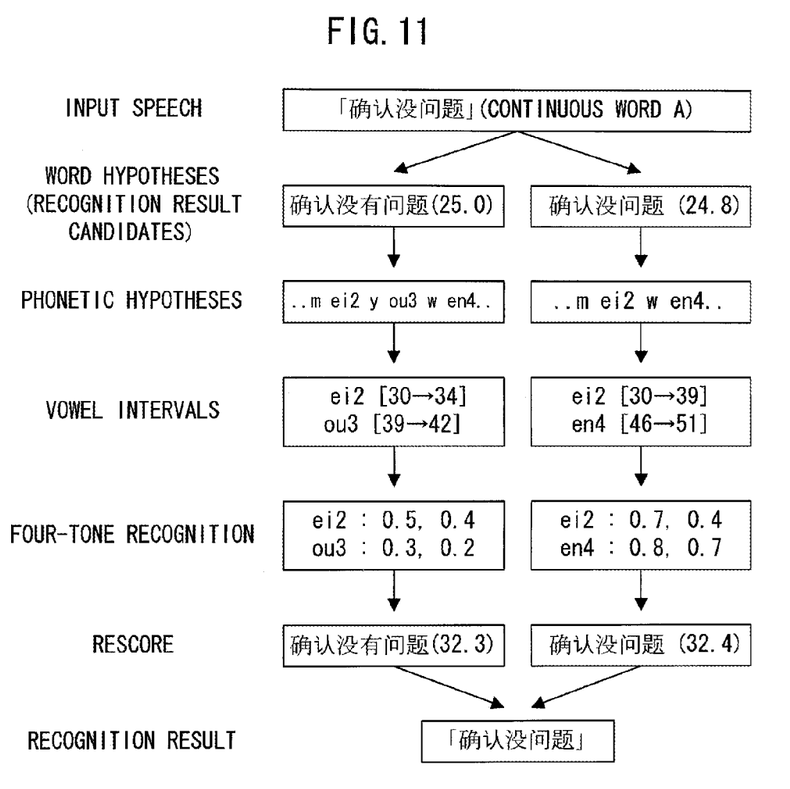
FIG. 11 is a view for explaining the operation of the example of the second exemplary embodiment.

An acoustic analysis unit 150, distance calculation unit 160, and word search unit 170 perform the same processes as described above. Assume that the continuous words A and B are thus obtained as word hypotheses (recognition result candidates), as shown in FIG. 11. In the example of FIG. 11, the scores of the continuous words A and B are "24.8" and "25.0", respectively. That is, the likelihood of the continuous word B is higher at this point of time.

A word hypothesis identification unit 180, phonetic hypothesis identification unit 190, and vowel interval identification unit 200 in the word search unit 170 also perform the same processes as described. The vowel intervals of the continuous words A and B and their tone labels are output to the four-tone recognition unit 210a. More specifically, for the continuous word A including phonemes "q ue4 r en4 m ei2 w en4 t i2", vowel intervals (frame information) of vowels "ue4", "en4", "ei2", "en4", and "i2" and their tone labels are output. For the continuous word B including phonemes "q ue4 r en4 m ei2 y ou3 w en4 t i2", vowel intervals (frame information) of vowels "ue4", "en4", "ei2", "ou3", "en4", and "i2" and their tone labels are output.

The four-tone recognition unit 210a executes four-tone recognition for the vowel intervals of the continuous words A and B received from the word search unit 170 using the four-tone models and the four-tone bigram models.

Assume that by applying the pitch contours and four-tone chain probabilities of the target vowel intervals, for, e.g., an interval "m ei2 y ou3 w en4", scores based on the pitches of "ei2", "ou3", and "en4" are obtained as "0.5", "0.3", and "0.6", and scores based on the chain probabilities are obtained as "0.4", "0.2", and "0.3", respectively. As for the chain probability using the four-tone bigram models, the probability of a tone $T_i$ of the target vowel is calculated, using a tone of the immediately preceding vowel, by $$P(T_i)=P(T_i|T_{i-1})$$

Since, for example, the immediately preceding vowel of "ei2" is "en4" having the fourth tone, "0.4" is obtained as the chain probability of the second tone and the fourth tone. Similarly assume that for an interval "m ei2 w en4", scores based on the pitches of "ei2" and "en4" are obtained as "0.7" and "0.8", and scores based on the chain probabilities are obtained as "0.4" and "0.7", respectively. In this case, as the results of rescore of all intervals by the rescore unit 220, for example, "32.4" is obtained as the score of the continuous word A, and "32.3" is obtained as the score of the continuous word B. An output unit 230 outputs, e.g., the continuous word A as the most likely result.

In this way, not only the pitch information of each vowel interval but also the chain probability representing the connectability of four tones is used, thereby raising the four-tone recognition accuracy.

In this example, a score obtained from a tone model and a score obtained from a context model are simply added for rescore. However, the scores may be normalized by the number of syllables or the number of frames. For example, a weighted sum may be calculated. The normalization makes it possible to suppress variations in scores caused by the difference in the number of syllables included in the word hypotheses upon recognizing continuous speech and further raise the recognition accuracy.

Note that in each exemplary embodiment, tones have been exemplified. However, any prosody other than tones is usable if it allows a description on a dictionary and identification of intervals. For, e.g., English accents, the accent type of each word is described in a dictionary. The time-rate change of the short-time speech power of each accent type is modeled as a feature amount, and an accent interval in each word is identified as a recognition target interval.

Third Exemplary Embodiment of Present Invention

Figure 12:
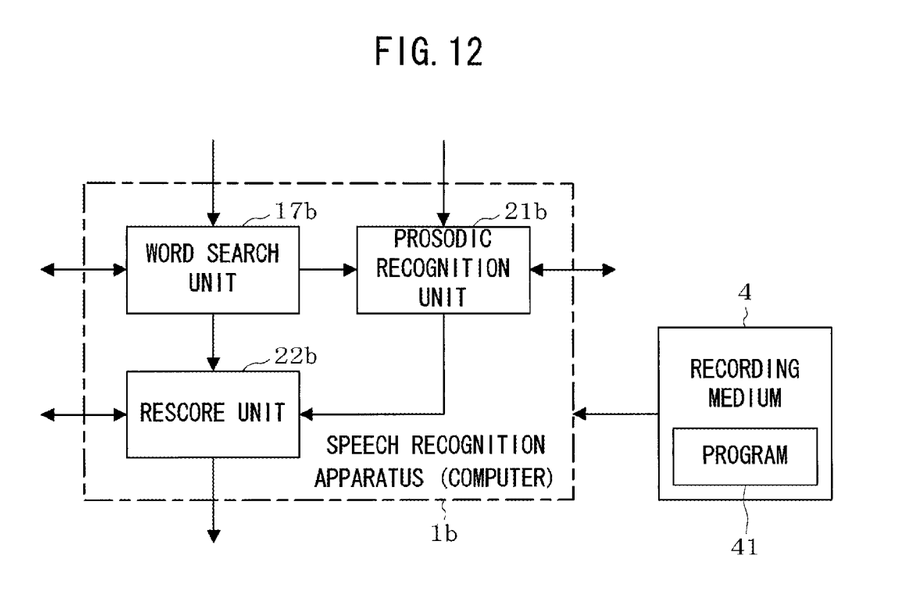
FIG. 12 is a block diagram of a speech recognition apparatus according to the third exemplary embodiment of the present invention.

FIG. 12 is a block diagram showing an example of the overall arrangement of a speech recognition apparatus according to the third exemplary embodiment of the present invention. Referring to FIG. 12, a speech recognition apparatus 1b includes a word search unit 17b, prosodic recognition unit 21b, and rescore unit 22b.

The word search unit 17b has a function of executing a word search based on the acoustic distance between each phonetic model and the feature amount of input speech and the phonemes of words in language models, and outputting, as a word search result, word hypotheses and first scores representing the likelihoods of the word hypotheses. Note that the language models include the phonemes and prosodic labels of words. Also assuming that the recognition result of the input speech is a word hypothesis, the word search unit 17b outputs prosodic intervals and their prosodic labels in the input speech.

The prosodic recognition unit 21b has a function of outputting second scores each representing the likelihood of a prosodic label output from the word search unit 17b, based on one of the input feature amounts corresponding to a prosodic interval output from the word search unit 17b. The rescore unit 22b has a function of correcting the first score of each word hypothesis output from the word search unit 17b using the second scores output from the prosodic recognition unit 21b.

The speech recognition apparatus 1b can also be regarded as an apparatus including the phonetic model storage unit 11, language model storage unit 12, tone model storage unit 13, input unit 14 acoustic analysis unit 15, distance calculation unit 16, and output unit 23 in FIG. 1, or an apparatus including the externally connected context model storage unit 31 in FIG. 8 in addition to these functional units.

In this exemplary embodiment as well, it is possible to accurately recognize voice tone speech, as in the speech recognition apparatuses 1 and 1b shown in FIGS. 1 and 8.

Note that the speech recognition apparatus 1b can be implemented by a computer in, e.g., the following way. A disk, semiconductor memory, or any other mechanically readable recording medium 4 recording a program 41 that causes a computer to function as the speech recognition apparatus 1b is prepared, and the computer reads out the program 41. The computer controls its operation based on the readout program 41, thereby implementing the word search unit 17b, prosodic recognition unit 21b, and rescore unit 22b.

The present invention has been described above with reference to the exemplary embodiments and examples, but is not limited to the above-described exemplary embodiments and examples. The arrangement and details of the invention can be variously modified within the scope of the invention, and these modifications will readily occur to those skilled in the art.

INDUSTRIAL APPLICABILITY

The present invention is applicable to a human interface using speech recognition of a voice tone language such as Chinese.

The invention claimed is:

1. A speech recognition apparatus comprising:
a word search unit that performs a word search based on an acoustic distance between a phonetic model and a feature amount of input speech and a phoneme of a word in a language model including the phoneme and a prosodic label of the word, outputs a word hypothesis and a first score representing likelihood of the word hypothesis as a word search result, and when assuming that a recognition result of the input speech is the word hypothesis, outputs a prosodic interval and a prosodic label of the prosodic interval in the input speech;
a prosodic recognition unit that outputs a second score representing likelihood of the prosodic label output from said word search unit, based on one of feature amounts of the input speech corresponding to the prosodic interval output from said word search unit; and
a rescore unit that corrects the first score of the word hypothesis output from said word search unit using the second score output from said prosodic recognition unit,
wherein the prosodic label is one of a tone label and an accent type, and the prosodic interval is one of a vowel interval and an accent interval.

2. A speech recognition apparatus according to claim 1, wherein said rescore unit performs one of correcting a score of a word hypothesis under processing in the word search and correcting a score of an intermediate result obtained as a result of the word search.

3. A speech recognition apparatus according to claim 2, wherein the intermediate result is one of an Nbest candidate and a word graph.

4. A speech recognition apparatus according to claim 1, wherein the prosodic label is the tone label, and the prosodic interval is the vowel interval.

5. A speech recognition apparatus according to claim 4, wherein said word search unit comprises:
a word hypothesis identification unit that identifies at least one of a word and a continuous word;
a phonetic hypothesis identification unit that identifies a phoneme in at least one of the word and the continuous word using the language model; and
a vowel interval identification unit that identifies an interval of a vowel of the phonemes.

6. A speech recognition apparatus according to claim 5, wherein said vowel interval identification unit identifies, as the vowel interval, an interval from a start time to an end time of a hypothesis of the vowel in the word search.

7. A speech recognition apparatus according to claim 4, wherein said prosodic recognition unit performs prosodic recognition using a tone model which is modeled using a time-rate change of a pitch in the vowel interval as a feature amount.

8. A speech recognition apparatus according to claim 7, wherein the tone model is independent of the phonetic model used to calculate the acoustic distance.

9. A speech recognition apparatus according to claim 4, wherein said prosodic recognition unit performs prosodic recognition using a tone model which is modeled using a time-rate change of a pitch in the vowel interval as a feature amount and a context model created by modeling context information serving as prosodic history information.

10. A speech recognition apparatus according to claim 9, wherein the context model is created by modeling a chain probability of a tone of a vowel.

11. A speech recognition method comprising the steps of:
performing a word search based on an acoustic distance between a phonetic model and a feature amount of input speech and a phoneme of a word in a language model including the phoneme and a prosodic label of the word, outputting a word hypothesis and a first score representing likelihood of the word hypothesis as a word search result, and when assuming that a recognition result of the input speech is the word hypothesis, outputting a prosodic interval and a prosodic label of the prosodic interval in the input speech;
outputting a second score representing likelihood of the output prosodic label based on one of feature amounts of the input speech corresponding to the output prosodic interval; and
correcting the output first score of the word hypothesis using the output second score,
wherein the prosodic label is one of a tone label and an accent type, and the prosodic interval is one of a vowel interval and an accent interval.

12. A speech recognition method according to claim 11, wherein the correcting step comprises one of the steps of correcting a score of a word hypothesis under processing in the word search, and correcting a score of an intermediate result obtained as a result of the word search.

13. A speech recognition method according to claim 12, wherein the intermediate result is one of an Nbest candidate and a word graph.

14. A speech recognition method according to claim 11, wherein the prosodic label is the tone label, and the prosodic interval is the vowel interval.

15. A speech recognition method according to claim 14, wherein the step of performing the word search comprises the steps of:
identifying at least one of a word and a continuous word;
identifying a phoneme in at least one of the word and the continuous word using the language model; and
identifying an interval of a vowel of the phonemes.

16. A speech recognition method according to claim 15, wherein the step of identifying the interval comprises the step of identifying, as the vowel interval, an interval from a start time to an end time of a hypothesis of the vowel in the word search.

17. A speech recognition method according to claim 14, wherein the step of outputting the second score comprises the step of performing prosodic recognition using a tone model which is modeled using a time-rate change of a pitch in the vowel interval as a feature amount.

18. A speech recognition method according to claim 17, wherein the tone model is independent of the phonetic model used to calculate the acoustic distance.

19. A speech recognition method according to claim 14, wherein the step of outputting the second score comprises the step of performing prosodic recognition using a tone model which is modeled using a time-rate change of a pitch in the vowel interval as a feature amount and a context model created by modeling context information serving as prosodic history information.

20. A speech recognition method according to claim 19, wherein the context model is created by modeling a chain probability of a tone of a vowel.

* * * * *